(12) United States Patent
Huang

(10) Patent No.: US 7,624,997 B2
(45) Date of Patent: Dec. 1, 2009

(54) RECYCLING CART

(75) Inventor: De-Wen Huang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 11/964,816

(22) Filed: Dec. 27, 2007

(65) Prior Publication Data

US 2009/0058027 A1 Mar. 5, 2009

(30) Foreign Application Priority Data

Aug. 31, 2007 (CN) .................. 2007 1 0076767

(51) Int. Cl.
*B62B 3/02* (2006.01)
*B07B 1/50* (2006.01)
(52) U.S. Cl. .................. 280/47.35; 209/404
(58) Field of Classification Search ............ 280/33.991, 280/33.992, DIG. 3, DIG. 4, 47.34, 47.35, 280/47, 763.1, 847, 159; 15/320; 211/106; 235/383, 385, 462; 220/909; 364/401; 248/121, 248/125.7, 125.9, 295.11, 296.1; 209/404, 209/405, 408
See application file for complete search history.

(56) References Cited

U.S. PATENT DOCUMENTS

| 461,250 | A | * | 10/1891 | Sackett | 209/404 |
| 590,897 | A | * | 9/1897 | Meht | 298/5 |
| 1,380,468 | A | * | 6/1921 | Drew | 403/236 |
| 1,763,174 | A | * | 6/1930 | Morris | 210/474 |
| 2,020,766 | A | * | 11/1935 | Brown | 280/639 |
| 2,673,671 | A | * | 3/1954 | Williams | 224/555 |
| 2,730,320 | A | * | 1/1956 | Srader | 248/647 |
| 2,901,262 | A | * | 8/1959 | Berlin | 280/641 |
| 2,941,769 | A | * | 6/1960 | Alpard | 248/111 |
| 3,079,162 | A | * | 2/1963 | Michels, Jr. | 280/7.1 |
| 3,118,553 | A | * | 1/1964 | Rosenzweig | 414/469 |
| 3,534,973 | A | * | 10/1970 | Elliott | 280/33.992 |
| 4,326,731 | A | * | 4/1982 | Woychio et al. | 280/641 |
| 4,498,422 | A | * | 2/1985 | Sou | 119/480 |
| 4,632,457 | A | * | 12/1986 | Hofrichter et al. | 297/335 |
| 4,741,069 | A | * | 5/1988 | Helm et al. | 15/320 |
| 4,948,077 | A | * | 8/1990 | Gonzalez | 248/129 |
| 4,961,246 | A | * | 10/1990 | Hauge et al. | 15/401 |
| 5,032,254 | A | * | 7/1991 | Deboer et al. | 209/10 |
| 5,072,958 | A | * | 12/1991 | Young | 280/40 |
| 5,125,674 | A | * | 6/1992 | Manuszak | 280/30 |
| 5,244,220 | A | * | 9/1993 | Cortez | 280/47.26 |

(Continued)

FOREIGN PATENT DOCUMENTS

GB 2175863 A * 12/1986

*Primary Examiner*—Paul N Dickson
*Assistant Examiner*—Chiedu A Chibogu
(74) *Attorney, Agent, or Firm*—Steven M. Reiss

(57) ABSTRACT

A recycling cart (100) for sorting, retaining, and transferring articles is provided. The recycling cart includes a waste container (10), at least four supporting members (20), at least four rotating members (30), and a sorting member (50). The supporting members are attached with the waste container. The rotating members are attached with the supporting members and configured for facilitating moving the recycling cart. The sorting member is configured for sorting articles. The sorting member is hinged with two of at least four supporting members and located above the waste container.

16 Claims, 3 Drawing Sheets

U.S. PATENT DOCUMENTS

| | | | |
|---|---|---|---|
| 5,863,055 A * | 1/1999 | Kasravi et al. | 280/47.29 |
| 5,906,383 A * | 5/1999 | Cortes | 280/47.371 |
| 6,206,385 B1 * | 3/2001 | Kern et al. | 280/47.35 |
| 6,397,427 B1 * | 6/2002 | Bryngelsson | 15/228 |
| 6,827,364 B1 * | 12/2004 | Martin | 280/641 |
| 7,213,817 B2 * | 5/2007 | Cheung | 280/42 |
| 2003/0192187 A1 * | 10/2003 | Bean | 30/277 |
| 2003/0197339 A1 * | 10/2003 | D'Angelo | 280/33.991 |

* cited by examiner

RECYCLING CART

BACKGROUND OF THE INVENTION

1. Field of the Invention

The present invention relates to recycling carts, particularly to a recycling cart used for sorting, retaining, and transferring articles.

2. Description of Related Art

In manufacturing, waste articles, such as waste materials, waste products, and the like, ought to be cleaned and collected at any time for maintaining neatness of the workshop. A typically implemented way is to manually dump the waste articles into a waste bin by operators.

However, the dumped waste articles often contain some useful articles, such as raw materials, small components (e.g., screws or bolts), or the like. If the useful articles do not get sorted from other waste articles and directly coped without recycling, the useful articles become waste. Moreover, in maintaining neatness of the workshop, additional operators may be required thus, increasing the cost of labor.

Therefore, a heretofore-unaddressed need exists in the art to address the aforementioned deficiencies and inadequacies.

SUMMARY

In present aspect, a recycling cart for sorting, retaining, and transferring articles is provided. The recycling cart includes a waste container, at least four supporting members, at least four rotating members, and a sorting member. The supporting members are attached with the waste container. The rotating members are attached with the supporting members and configured for facilitating movement of the recycling cart. The sorting member is configured for sorting articles. The sorting member is hinged with two of at least four supporting members and located above the waste container.

These and other aspects of the present invention will become more apparent from the following detailed description of the preferred embodiments taken in conjunction with the accompanying drawings, although variations and modifications therein may be affected without departing from the spirit and scope of the novel concepts of the disclosure.

BRIEF DESCRIPTION OF THE DRAWINGS

Many aspects of the present recycling cart can be better understood with reference to the following drawings. These drawings are not necessarily drawn to scale, the emphasis instead being placed upon clearly illustrating the principles of the present recycling cart. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Figure 1:
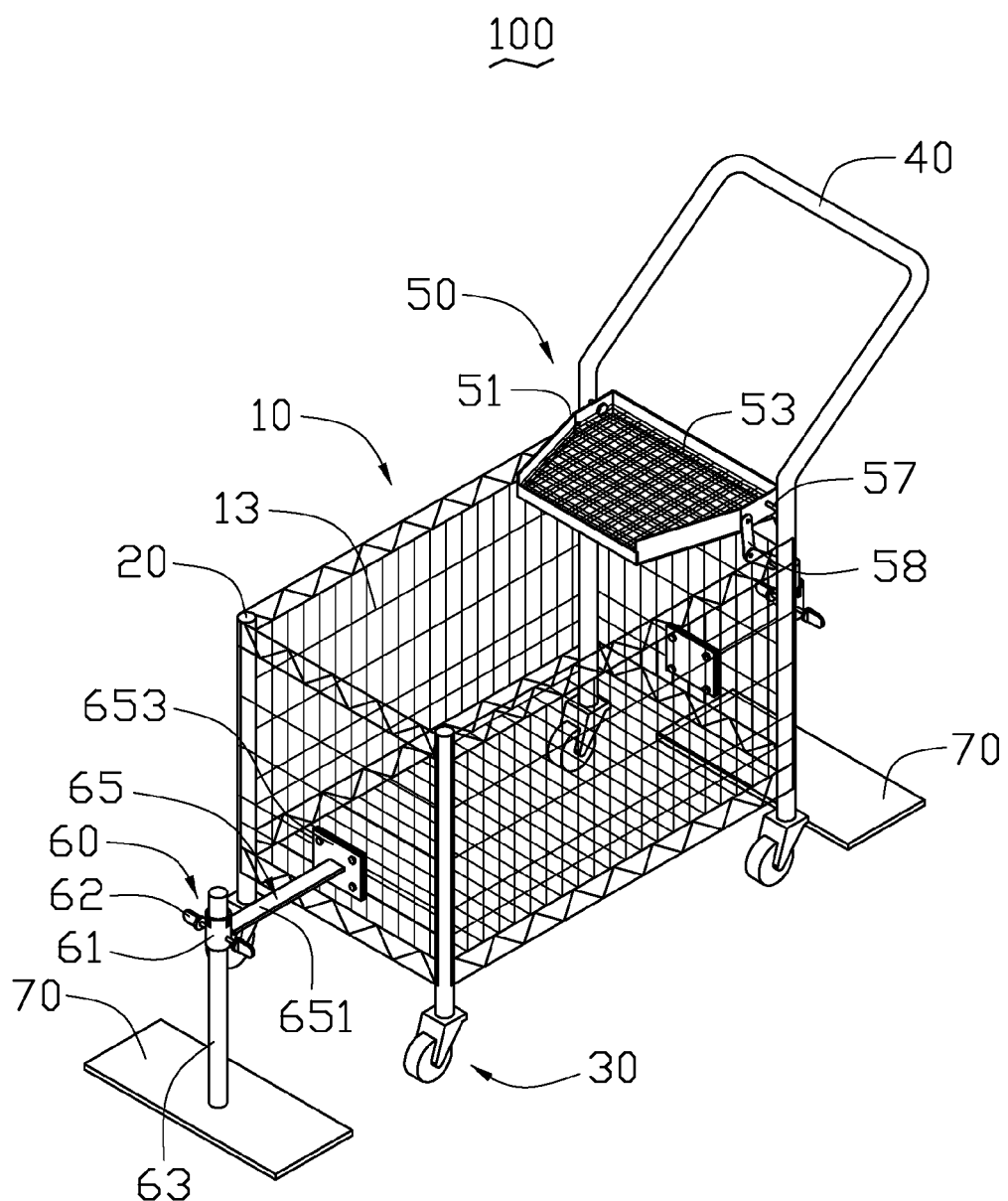
FIG. 1 is an isometric view of a recycling cart in accordance with a present embodiment.
Figure 2:
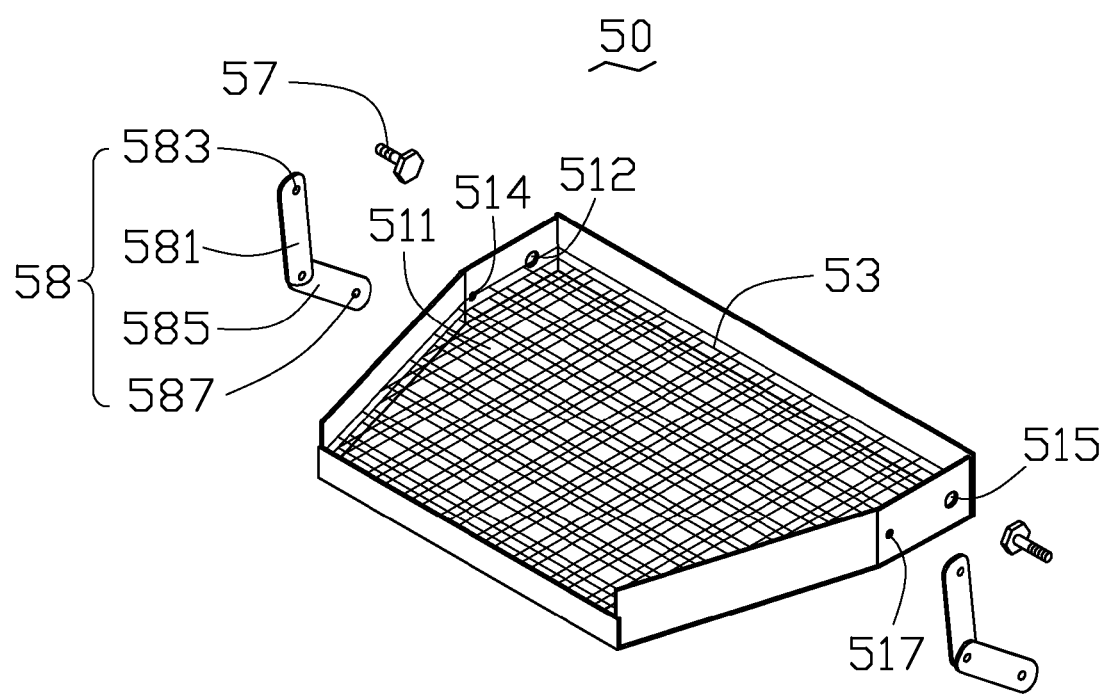
FIG. 2 is an isometric view of a sorting member of the recycling cart shown in FIG. 1.
Figure 3:
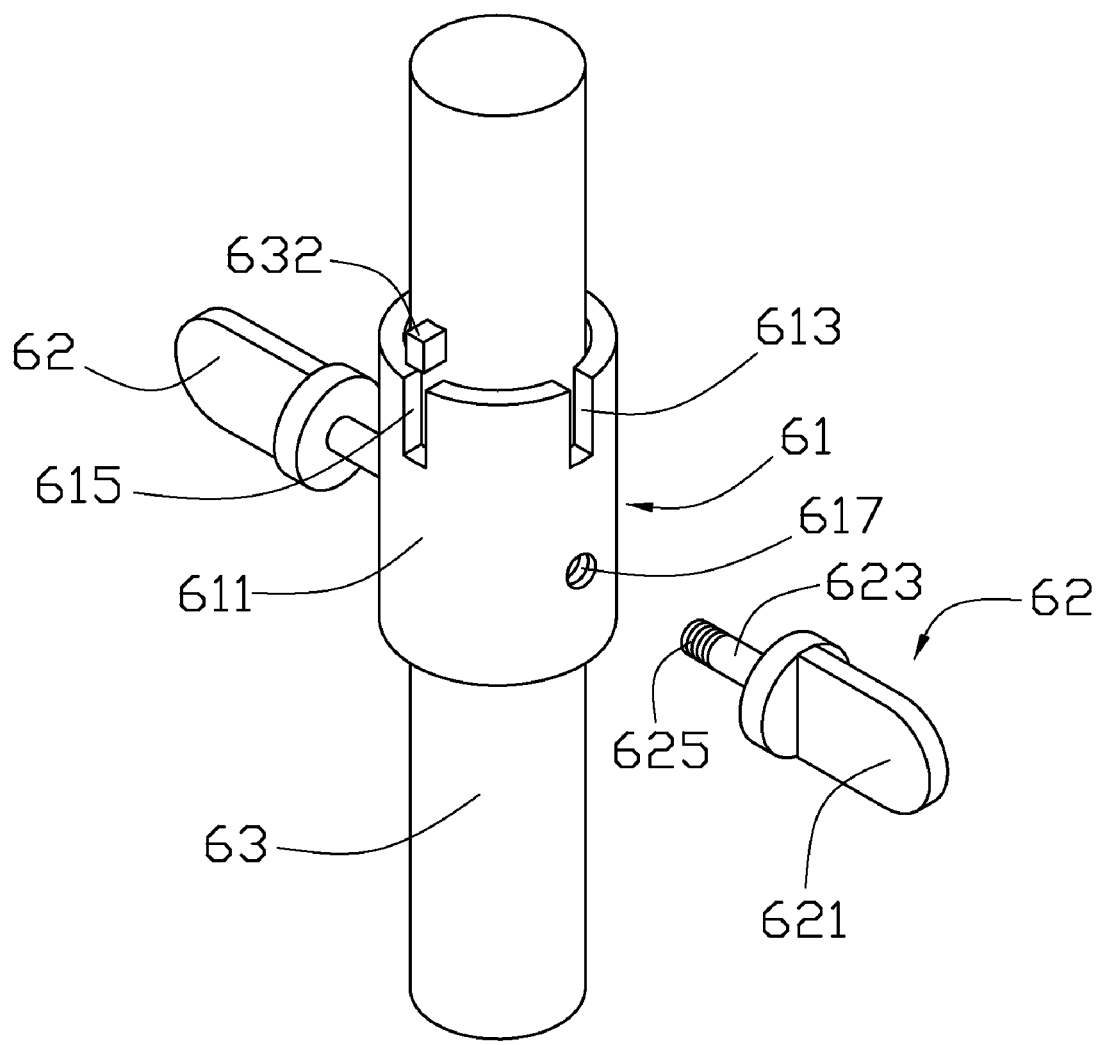
FIG. 3 is an isometric view of an adjusting member of the recycling cart shown in FIG. 1.

The present recycling cart for sorting, retaining, and transferring articles is described here in conjunction with the accompanying drawings in FIGS. 1 through 3.

Referring to FIG. 1, the recycling cart 100 includes a waste container 10, four supporting members 20, four rotating members 30, a handrail 40, a sorting member 50, two adjusting members 60, and two cleaning members 70.

The waste container 10 is generally cubic-shaped with four corners and defining a containing space 13. The containing space 13 has an open end (not labeled) thereof and is configured (e.g., structure/arranged) for containing/accommodating waste articles (not shown) therein. The waste container 10 can be made of one or more materials including wood material, metallic material, rattan material, and etc.

The four supporting members 20 each are configured for directly fixing/attaching (e.g., welding, adhering, or integrally formed) with one respective corner of the waste container 10, thus, cooperatively directly supporting the waste container 10. Each supporting member 20 is cylindrical-shaped post and exposes from one close end opposite to the open end of the waste container 10 when fixed with the waste container 10.

The four rotating members 30 each are configured for fixing/attaching (e.g., welding, adhering, or integrally formed) with one respective supporting member 20, thus, cooperatively facilitating a rotational movement of the waste container 10. Each rotating members 30 is a round wheel and located below the close end of the waste container 10 when fixed with the supporting member 20.

The handrail 40 is used for conveniently moving the recycling cart 100, which generally has a U-shaped rail and has two ends thereof respectively attached (e.g., welding or integrally formed) with two adjacent supporting members 20. The handrail 40 is located above the open end of the waste container 10 as attached with the supporting members 20.

Referring further to FIG. 2, the sorting member 50 is configured for sorting articles and separating them into two types of article grades, i.e., waste article grade and useful article grade, and being directly hinged with two of the four supporting members 20. The sorting member 50 includes a base plate 51, a sorting screen 53, two first hinge members 57, and two second hinge members 58. The base plate 51 is advantageously a recessed plate with an accommodating space 511 for accommodating the sorted articles (not shown). The sorting screen 53 is detachably secured within the accommodating space 511, thereby separating the accommodating space 511 into a top space (not labeled) and a bottom space (not labeled). The sorting screen 53 is advantageously latticed with a plurality of meshes defined therein. The meshes are scaled/configured for sorting the articles, i.e., separating the useful articles with the waste articles, where the useful articles pass through the meshes into the bottom surface end the waste articles stay on the top surface of the sorting screen 53.

The two first hinge members 57 are advantageously bolts, which respectively engage through two opposite engaging holes 512 and 515 defined through two opposite sidewalls of the base plate 51 and into two corresponding matching holes (not labeled) of the handrail 40, thereby fascinating the hinge of the sorting member 50 and the handrail 40. The sorting member 50 thus attaches with the handrail 40 and rotates relative to the handrail 40 around the two first hinge members 57.

The two second hinge members 58 each have a first connecting board 581 and a second connecting board 585 hinged with the first connecting board 581. The two first connecting boards 581 each have a first fixing hole 583 defined therethrough. The two first fixing holes 583 respectively correspond to two opposite securing holes 514 and 517 defined through the two opposite sidewalls of the sorting member 50 and each located adjacent to one respective engaging hole 512 or 515. The two first fixing holes 583 combined with the two securing holes 514 and 517 to facilitate the fixing (e.g., screwing or welding) of the first connecting board 581 with the sorting member 50.

The two second connecting board 585 each have a second fixing hole 587 defined therethrough. The two second fixing holes 587 respectively correspond to two opposite attaching holes (not labeled) defined through two opposite supporting members 20. The two second fixing holes 587 combined with the two attaching holes to facilitate the fixing (e.g., screwing or welding) of the second connecting board 585 with the supporting member 20. The two second hinge members 58 thus facilitate holding the sorting member 50 with the supporting members 20 and turning the sorting member 50 towards the containing space 13 of the waste container 10.

Referring also to FIG. 3, the two adjusting members 60 are respectively assembled on the two opposite sidewalls of the waste container 10 and located apart from the waste container 10. Each adjusting member 60 includes a sleeve 61, two adjusting portions 62, a cylindrical shaft 63, and a connecting portion 65.

The sleeve 61 is generally a hollow cylinder with two open ends (not labeled) and a peripheral wall 611. The peripheral wall 611 encloses a receiving space within the sleeve 61. The peripheral wall 611 has a first slot 613 and a second slot 615 defined therethrough along an axis direction at one end thereof proximate to the open end of the sleeve 61. The first slot 613 and second slot 615 are spaced from each other with an approximate vertical angle. It is to be understood that the first slot 613 and second slot 615 can instead be spaced from each other of any angles. It is also to be understood that the peripheral wall 611 may have more than two slots defined therethrough at the same end thereof. The slots can be evenly spaced from each other or otherwise be irregularly arranged with each other.

The peripheral wall 611 further has two adjusting holes 617 defined therethrough along a radial direction in communication with the receiving space. The two adjusting holes 617 are advantageously screw holes and located in a symmetrical manner about an axis line (not shown) of the sleeve 61.

The two adjusting portions 62 each include an operating portion 621 and a fixing portion 623 connecting with the operating portion 621. The operating portion 621 is roughly T-shaped so as to be relatively easy for users to operate the operating portion 621 to rotate the adjusting portion 62. The fixing portion 623 is a cylindrical rod and has a mating portion 625 therein along a peripheral direction corresponding to the adjusting hole 617 of the sleeve 61. The mating portion 625 is correspondingly a screwed portion, which has a plurality of screws defined in an exterior surface thereof.

The shaft 63 is configured to be slidably engages through the sleeve 61. The shaft 63 has a retaining portion 632 protruded from an outer circumferential surface of the shaft 63. The retaining portion 632 is configured to slidably engage into either the first slot 613 or the second slot 615.

The connecting portion 65 is generally a bar 651 integrally formed with a rectangular fixing plate 653 on an end of the bar 651. The other opposite end of the bar 651 is attached (e.g., welded or integrally formed) with the sleeve 61. The fixing plate 653 is configured for facilitating the attachment (e.g., screwing or welding) of the connecting portion 65 with the waste container 10.

As assembled, the shaft 63 is inserted into the sleeve 61 with the retaining portion 632 engaging into one slot 613 or 615 of the sleeve 61. Two adjusting portions 62 are then separately adjusted via operating/rotating the operating portion 621 of the adjusting portion 62. During this stage, the fixing portion 623 of the adjusting portion 62 is threaded into one respective adjusting hole 617 via the engagement between the mating portion 625 and the adjusting hole 617. Each fixing portion 623 is threaded into the adjusting hole 617 until an end wall thereof resists against the shaft's 63 outer circumferential surface.

Referring back to FIG. 1, the two cleaning members 70 each are advantageously a swab and used for cleaning, e.g., floor of the workshop as the recycling cart moves. Each cleaning member 70 is attached with one end of the shaft 63 of the adjusting member 60. The cleaning member 70 is located below the waste container 10. The cleaning member 70 can instead be other device designed for cleaning such as suction cleaner, watering device, and etc. The two cleaning members 70 can further be a dry swab and a wet swab. The dry swab is positioned near the handrail 40 and the wet swab is located apart from the handrail 40.

In use, the recycling cart 100 moves as the handrail 40 being pushed. Articles, i.e., waste articles mixed with useful articles, are collected/dumped by operators in the receiving space 511 of the sorting member 50. The sorting screen 53 separates the useful articles with the waste articles, where the useful articles pass through the meshes into the bottom surface and the waste articles stay on the top surface of the sorting screen 53. The sorting member 50 is turned/rotated 50 toward the containing space 13 of the waste container 10 around the two first hinge members 57. The sorted waste articles are then dumped into the containing space 13. In this case, the useful articles are accommodated within the bottom space. As sorting screen 53 detached from the sorting member 50, the useful articles can be extracted from the sorting member 50.

Moreover, positions of the cleaning members 70 can be adjusted by the adjusting members 6. For example, the cleaning members 70 can be adjusted relative to floor of the workshop by adjusting the adjusting members 60. The mating portion 625 of each adjusting portion 62 is separately threaded out from the adjusting hole 617 of the sleeve 61. The shaft 63 is thus disengaged from the two adjusting portions 62 end can freely slide or rotate within the sleeve 61. The height of shaft 63 and the cleaning member 70 can be adjusted relative to the floor by elevating or lowering the shaft 63 relative to the sleeve 61. The angle of the cleaning members 70 can also be adjusted by enabling the retaining portion 632 originally secured in second slot 615 to engage and secure in the first slot 613. As the adjustment are done, the mating portion 625 of each adjusting portion 62 is reversely threaded into the adjusting hole 617 of the sleeve 61 until an end wall of the mating portion 625 resists against the shaft 63. The floor of the workshop is thus cleaned by the cleaning members 70 of the recycling cart 100 as the recycling cart 100 moves.

One main advantage of the present embodiment embodies that useful articles can be separated from the waste articles and collected via the sorting member 50. Meanwhile, in same process of coping with the dumped articles, neatness of the workshop's floor is maintained by moving the recycling cart 100. By using such recycling cart, only one operator is required to perform the tasks of separating/sorbing and cleaning. Cost of labor is correspondingly decreased.

Another main advantage of the present embodiment reflects that the floor of the workshop maintains neat via a cleaning of the cleaning members 70 as the recycling cart 100 moves. No additional operators are required to clean the floor. The labor cost is thus decreased.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A recycling can for sorting, retaining, and transferring articles, comprising:
    a waste container having four corners;
    at least four supporting members, each supporting member attached with to one of the corners of the waste container and configured for directly supporting the waste container therebetween;
    at least four rotating members attached with the supporting members, the rotating members configured for facilitating moving the recycling cart;
    a handrail; and
    a sorting member configured for sorting articles, the sorting member being located above the waste container, the sorting member comprising two first hinge members and two second hinge members, the two first hinge members hinging the sorting member with the handrail, and the second hinge members fixed to the supporting members and the sorting member, the second hinge members can pivot either to support the sorting member above the waste container, or to rotate the sorting member towards the waste container.

2. The recycling cart as claimed in claim 1, wherein the sorting member comprises a base plate and at least one sorting screen, the at least one sorting screen mounted on the base plate.

3. The recycling cart as claimed in claim 1, further comprising at least one cleaning member and at least one adjusting member, each of the at least one cleaning member being attached with one respective adjusting member, and each of the at least one adjusting member being attached with the waste container and configured for adjusting positions of the cleaning member.

4. The recycling cart as claimed in claim 3, wherein each of the at least one the cleaning members includes a dry swab and a wet swab, the wet swab being attached with one adjusting member, the dry swab being attached with another adjusting member, and the wet swab being located opposite to the dry swab.

5. The recycling cart as claimed in claim 3, wherein each of the at least one the adjusting members comprises a sleeve, two adjusting portions, a shaft, and a connecting portion, the shaft slidably engaging through the sleeve, the two adjusting portions configured for securing the shaft within the sleeve, and the connecting portion being attached with the sleeve and the waste container.

6. The recycling cart as claimed in claim 5, wherein the sleeve comprises a peripheral wall, the peripheral wall enclosing a receiving space for receiving the shaft, the peripheral wall having two adjusting holes defined therethrough in communication with the receiving space, and the adjusting portion engaging into the adjusting holes so as to secure the shaft within the sleeve.

7. The recycling cart as claimed in claim 6, wherein the two adjusting portions each comprise an operating portion and a fixing portion connecting with the operating portion, the fixing portion having a mating portion defined therein, and the mating portion being configured for engaging into the adjusting hole.

8. The recycling cart as claimed in claim 6, wherein the peripheral wall has at least one slot defined therethrough at one end thereof, the shaft having a retaining portion formed thereon, and the retaining portion being configured to slidably engage into the at least one slot.

9. The recycling cart as claimed in claim 1, further comprising a handrail, and the handrail having two ends thereof respectively attached with two adjacent supporting members.

10. The recycling cart as claimed in claim 1, wherein each rotating member is a round wheel.

11. The recycling cart as claimed in claim 2, wherein the base plate is a recessed plate with an accommodating space for accommodating the articles.

12. The recycling cart as claimed in claim 11, wherein the sorting screen is latticed with a plurality of meshes, and the meshes are configured for sorting the articles.

13. The recycling cart as claimed in claim 2, wherein the two first hinge members are bolts engaging through two engaging holes defined through two opposite sidewalls of the base plate and into two corresponding matching holes of the handrail.

14. The recycling cart as claimed in claim 2, wherein the two second hinge members each have a first connecting board and a second connecting board hinged with the first connecting board.

15. The recycling cart as claimed in claim 14, wherein the two first connecting boards each have a first fixing hole defined therethrough, the two first fixing holes respectively correspond to two securing holes defined through the two opposite sidewalls of the sorting member, the two securing holes are opposite to each other and each securing hole is located adjacent to one respective engaging hole.

16. The recycling cart as claimed in claim 15, wherein the two second connecting board each have a second fixing hole defined therethrough, the two second fixing holes respectively correspond to two attaching holes defined through two opposite supporting members, and the two attaching holes are opposite to each other.

* * * * *